March 12, 1963
R. B. HOLT ETAL
3,080,979
GREASE SHIELD STRUCTURE FOR OVENS
Filed May 26, 1961
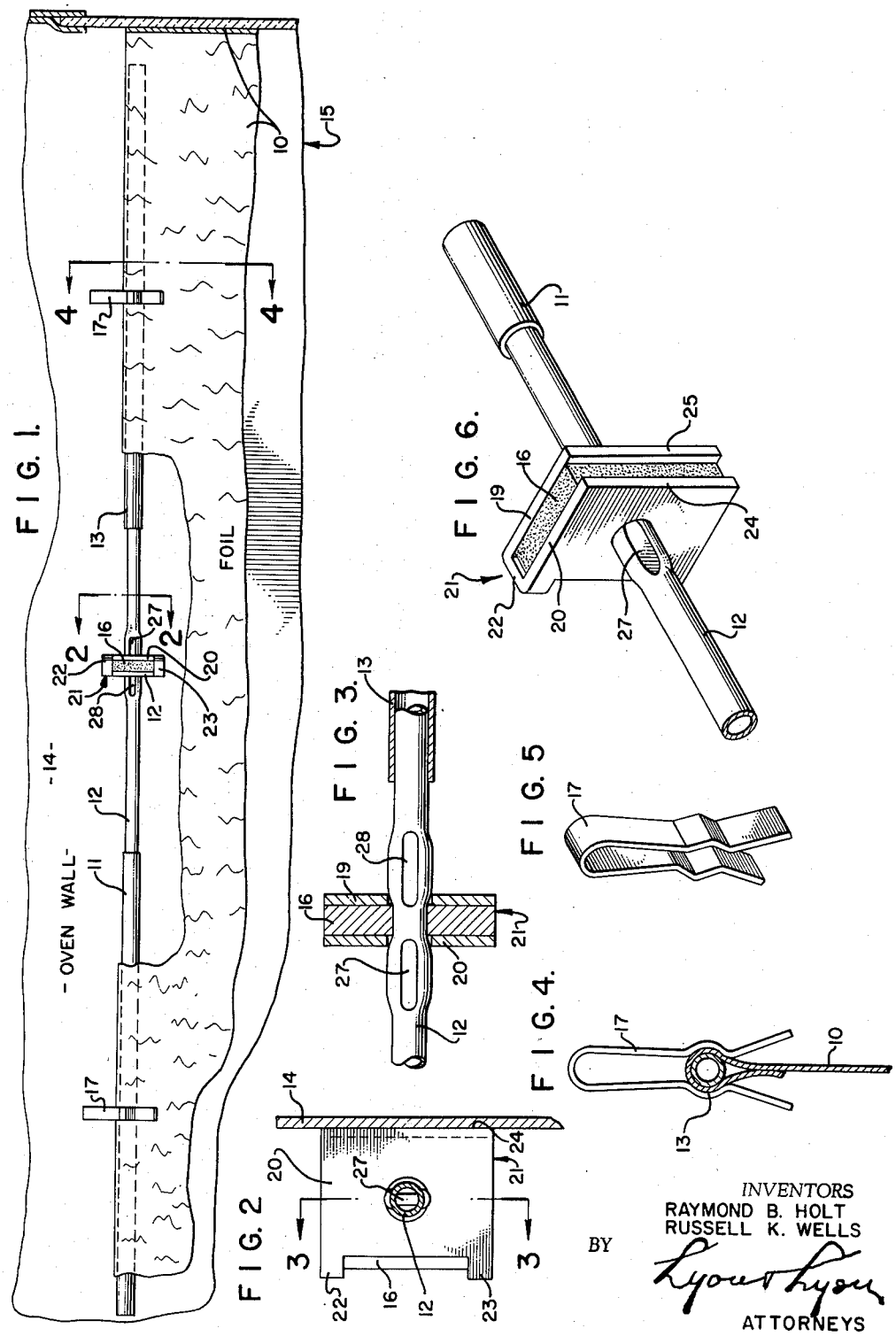
INVENTORS
RAYMOND B. HOLT
RUSSELL K. WELLS
BY
ATTORNEYS

United States Patent Office 3,080,979
Patented Mar. 12, 1963

3,080,979
GREASE SHIELD STRUCTURE FOR OVENS
Raymond B. Holt, 240 Hampden Terrace, Alhambra, Calif., and Russell K. Wells, 516 Galer Place, Glendale 6, Calif.
Filed May 26, 1961, Ser. No. 112,890
2 Claims. (Cl. 211—105.3)

The present invention relates to means and techniques particularly applicable to household cooking ovens such as gas ranges, electric ranges and the like wherein it is desired to maintain the walls of the oven free from splatterings of food and grease during cooking of the food such as, for example, a chicken roast, steaks, etc.

In accordance with one important feature of the present invention there is provided an arrangement readily mountable and adjustable to fit the size of the different walls and doors of the oven. This is accomplished using an inexpensive and readily mountable structure and involves the use of a foil material such as commercially available aluminum foil that may be replaced after successive cooking operations.

An object of the present invention, therefore, is to provide novel means and techniques for preventing greases and fats from being splattered on the walls of a household oven when a comestible such as fowl or steak is being roasted in an oven.

Another object of the present invention is to provide an arrangement of this character which is readily mountable and adjustable to fit the sizes of various existing ovens.

Another object of the present invention is to provide an arrangement of this character which is readily removable from the oven and storable when not in use.

Another object of the present invention is to provide an arrangement of this character having as one important feature thereof that the foil mounted thereon may be placed and deformed to provide a protective shield for the corners of the oven where the removal of greases and fats, particularly when baked in such corners, is otherwise accomplished with hardship.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates an arrangement embodying features of the present invention mounted on a side wall of an oven.

FIGURE 2 is a view taken generally in the direction indicated by the arrows 2—2 in FIGURE 1.

FIGURE 3 is a sectional view taken generally in a direction indicated by the arrows 3—3 in FIGURE 2.

FIGURE 4 is a sectional view taken generally in the direction indicated by the arrows 4—4 in FIGURE 1.

FIGURE 5 is a perspective view of one of the foil-fastening clips illustrated in FIGURE 1.

FIGURE 6 is a perspective view showing a portion of the foil-mounting structure shown in FIGURE 1.

Referring to the drawings, the grease shield comprises generally a sheet of commercially available aluminum foil 10 mounted on three telescoping tubular elements 11, 12 and 13 by means of clips 17, these tubular elements 11, 12 and 13 being generally a support for the foil 10 and being maintained in position on the magnetizable wall 14 of an oven 15 by magnetic coaction between such wall 14 and permanent magnet 16 secured on the telescoping rod or tube 12 in the manner presently described.

The permanent magnet 16 is in the form of a slab of Alnico or other similar permanent magnet material and is loosely disposed between plate-like elements 19 and 20 of a magnetizable field structure 21, these two plate-like elements 19 and 20 being interconnected by integrally formed U-shaped portions 22 and 23 which maintain the plate-like elements 19 and 20 in parallel spaced relationship and with the planes of the front edge portions 24 and 25 of plate-like elements 20 and 19 respectively coplanar. This permanent magnet 16 has a centrally located apertured portion aligned with apertured portions in the plate-like elements 19 and 20 through which the central portion of rod or tube 12 extends.

In order to maintain the assembly 16, 21 centrally located on such rod or tube 12, the same is deformed as, for example, by crimping or otherwise enlarging the tube 12 on opposite sides of plate-like elements 19 and 20 at 27 and 28 to provide generally retaining shoulders that prevent movement of the assembly 16, 21 along the axis of tube 12. The centrally apertured portion of permanent magnet 16, however, is sufficiently enlarged to allow it to move with some freedom between the plate-like elements 19 and 20. This degree of movement of magnet 16 is such that it may rotate slightly about the axis of tube 12 and also may move slightly radially with respect to the tube 12 such that the magnet 16 may be free to move to a position wherein the holding forces between, on the one hand, the magnet 16 and its field structure 21 and the magnetizable wall 14 of the oven, on the other hand, are automatically optimized upon placement of the assembly in contact with the wall 14.

This centrally located rod or tube 12 is telescoped within the outer tubes 11 and 13, these latter tubes 11 and 13 thus being adjustable to provide different overall lengths commensurate with a particular length of an oven wall or door or other enclosure portion of the oven.

The foil 10 may be simply deformed by bending to be self-supporting on the assembly 11, 12, and 13 but preferably one or more releasable spring clips 17 are provided to clip the foil on the rods 11, 12 and 13 as illustrated in FIGURE 4. In installation usually the foil 10 is mounted on the telescoping elements 11, 12 and 13 after the elements 11 and 13 have been adjusted for size of oven on the one telescoping member 12. After the foil is cut to size and mounted on the adjusted assembly 11, 12 and 13, the composite assembly is then mounted on the wall of the oven wherein it is maintained by the magnetic coaction between, on the one hand, the permanent magnet 16 with its field structure 21 and, on the other hand, the magnetizable material comprising the wall 14 of the oven.

One feature of this construction is that only one magnet is required. Another important feature of this arrangement is that the outer ends of the adjustable tubes 11 and 13 are free from obstructions or a mounting thereon so that, as illustrated in FIGURE 1, the foil 10 may extend beyond the ends of the tubes and be deformed to cover the corners of the oven where grease collection always presents problems in cleaning.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A supporting arrangement for grease shield structure comprising a first elongated element, a magnetizable structure mounted on said element, a second element frictionally adjustable on one end of said first element, and a third element frictionally adjustable on the other end of said first element, said magnetizable structure comprising generally a slab of magnetizable material having its plane extending generally perpendicular to the axis of said elongated element and being loosely sandwiched within a magnetizable field structure, said field structure comprising two plate-like elements on opposite sides of said slab and said plate-like elements having an integrally formed U-shaped portion magnetically interconnecting ends of said plate-like elements.

2. An arrangement as set forth in claim 1 in which said first element is provided with shouldered portions abutting said plate-like elements.

References Cited in the file of this patent
UNITED STATES PATENTS

| | | |
|---|---|---|
| 2,710,695 | Mazany | June 14, 1955 |
| 2,841,132 | Philipp | July 1, 1958 |
| 2,948,407 | Wiszuk | Aug. 9, 1960 |